United States Patent
Mani et al.

(10) Patent No.: US 8,286,680 B2
(45) Date of Patent: Oct. 16, 2012

(54) TIRE WITH CIRCUMFERENTIAL GROOVES IN THE BEAD REGION

(75) Inventors: Neel K. Mani, Stow, OH (US); John L. Turner, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 626 days.

(21) Appl. No.: 12/430,928

(22) Filed: Apr. 28, 2009

(65) Prior Publication Data
US 2010/0269970 A1 Oct. 28, 2010

(51) Int. Cl.
*B60C 15/024* (2006.01)
(52) U.S. Cl. .......................................... 152/544
(58) Field of Classification Search .................. 152/544, 152/539
See application file for complete search history.

(56) References Cited

U.S. PATENT DOCUMENTS

| | | |
|---|---|---|
| 1,462,517 A | 7/1923 | Marquette |
| 1,915,963 A | 6/1933 | Wait |
| 2,484,620 A | 10/1949 | Glen |
| 2,563,787 A | 8/1951 | Keefe |
| 2,587,470 A | 2/1952 | Herzegh |
| 3,915,215 A | 10/1975 | Nebout |
| 4,015,652 A | 4/1977 | Harris |
| 4,184,531 A | 1/1980 | Honigsbaum |
| 4,209,051 A | 6/1980 | Udall |
| 4,269,251 A | 5/1981 | Harrington et al. |
| 4,805,682 A | 2/1989 | Griffiths et al. |
| 4,967,822 A | 11/1990 | Frerichs et al. |
| 5,044,413 A | 9/1991 | Noma et al. |
| 5,065,803 A | 11/1991 | Nakatani et al. |
| 5,145,536 A | 9/1992 | Noma et al. |
| 5,297,606 A | 3/1994 | Pompier et al. |
| 5,445,202 A * | 8/1995 | Nguyen et al. ............ 152/544 X |
| 5,769,981 A | 6/1998 | Turley et al. |
| 6,640,857 B2 | 11/2003 | Ikeda |
| 6,886,617 B2 | 5/2005 | Eynard et al. |
| 6,929,046 B1 | 8/2005 | Fontaine et al. |

FOREIGN PATENT DOCUMENTS

| | | |
|---|---|---|
| AU | 122731 | * 11/1946 |
| DE | 11643 C | * 9/1956 |
| DE | 959156 C | * 2/1957 |
| DK | 70063 | * 10/1949 |
| EP | 314445 | 5/1989 |
| EP | 334955 | 10/1989 |

(Continued)

OTHER PUBLICATIONS

Webster's New Collegiate Dictionary, G. & C. Merriam Company, Springfield, Massachusetts, 1977, pp. 507 and 1093.*

(Continued)

*Primary Examiner* — Adrienne C Johnstone
(74) *Attorney, Agent, or Firm* — Shaun J. Fox; Bryan Jaketic

(57) ABSTRACT

A tire comprising a circumferential tread, a circumferential tread, at least one circumferential belt, at least one carcass ply, a pair of sidewalls, and a pair of bead portions. Each of the bead portions comprising a bead core, a bead filler, a toe region, a heel region, a ledge region, and a flange region. The ledge region is provided between the toe region and the heel region, wherein the ledge region comprises at least one circumferentially continuous groove. The flange region each extending circumferentially about the tire, the flange region provided radially above the ledge region, wherein the flange region comprises at least one circumferentially continuous groove.

17 Claims, 8 Drawing Sheets

FOREIGN PATENT DOCUMENTS

| | | |
|---|---|---|
| EP | 358490 | 3/1990 |
| GB | 2008504 | 6/1979 |
| JP | 53114102 | 10/1978 |
| JP | 63053103 | 3/1988 |
| JP | 2241808 | 9/1990 |
| JP | 03169727 A * | 7/1991 |
| JP | 6001101 | 1/1994 |
| JP | 6127221 | 5/1994 |
| JP | 07069010 A * | 3/1995 |
| JP | 8175124 | 7/1996 |
| JP | 10193927 A * | 7/1998 |
| JP | 11078441 | 3/1999 |
| JP | 2004306654 | 11/2004 |

OTHER PUBLICATIONS

English machine-assisted translation of West German Patent 959 156 C, Feb. 28, 1957.*

* cited by examiner

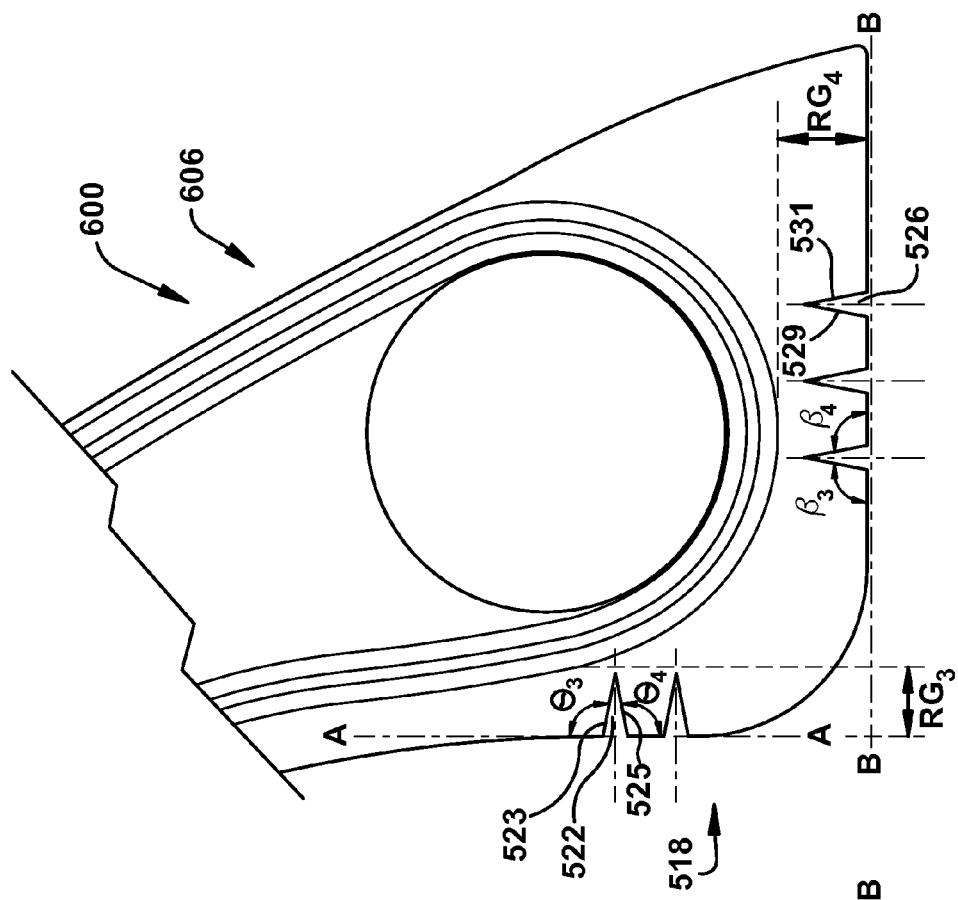
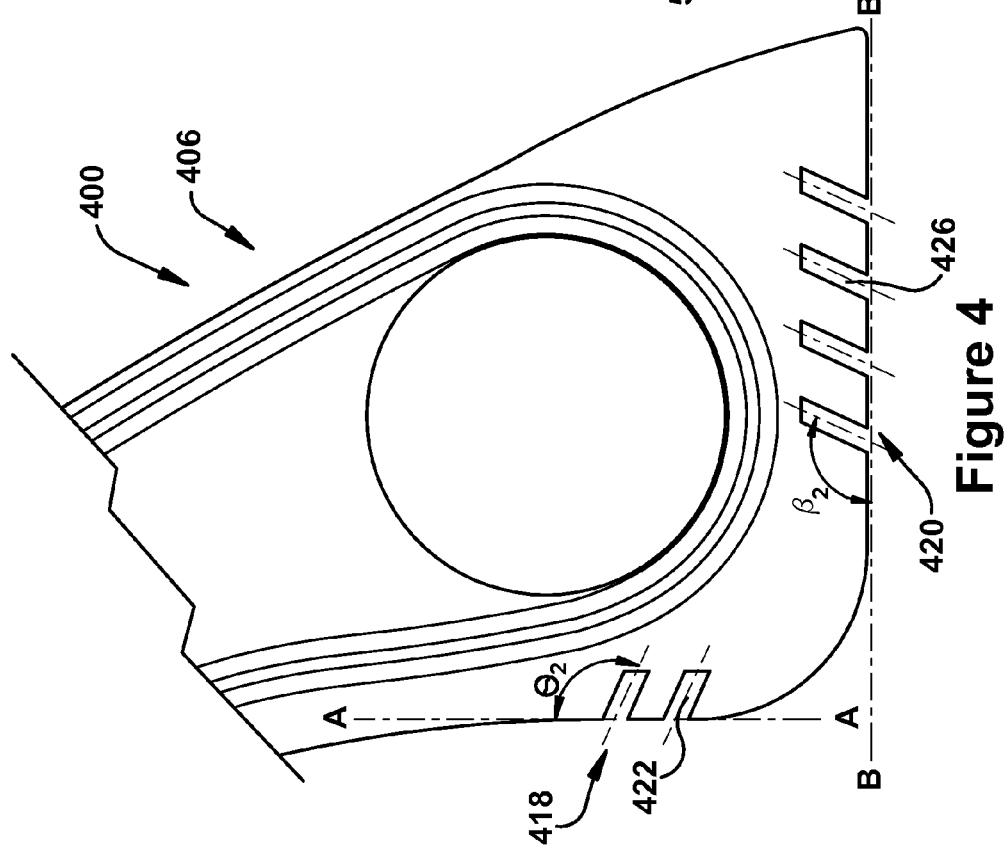

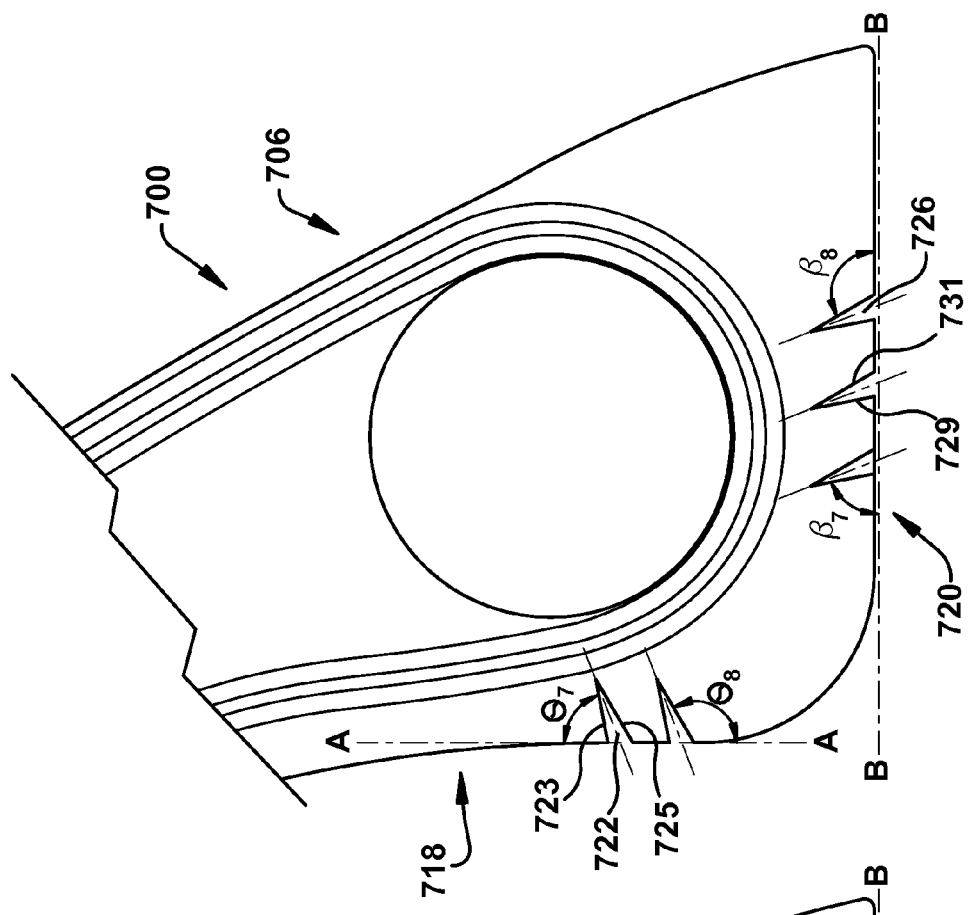
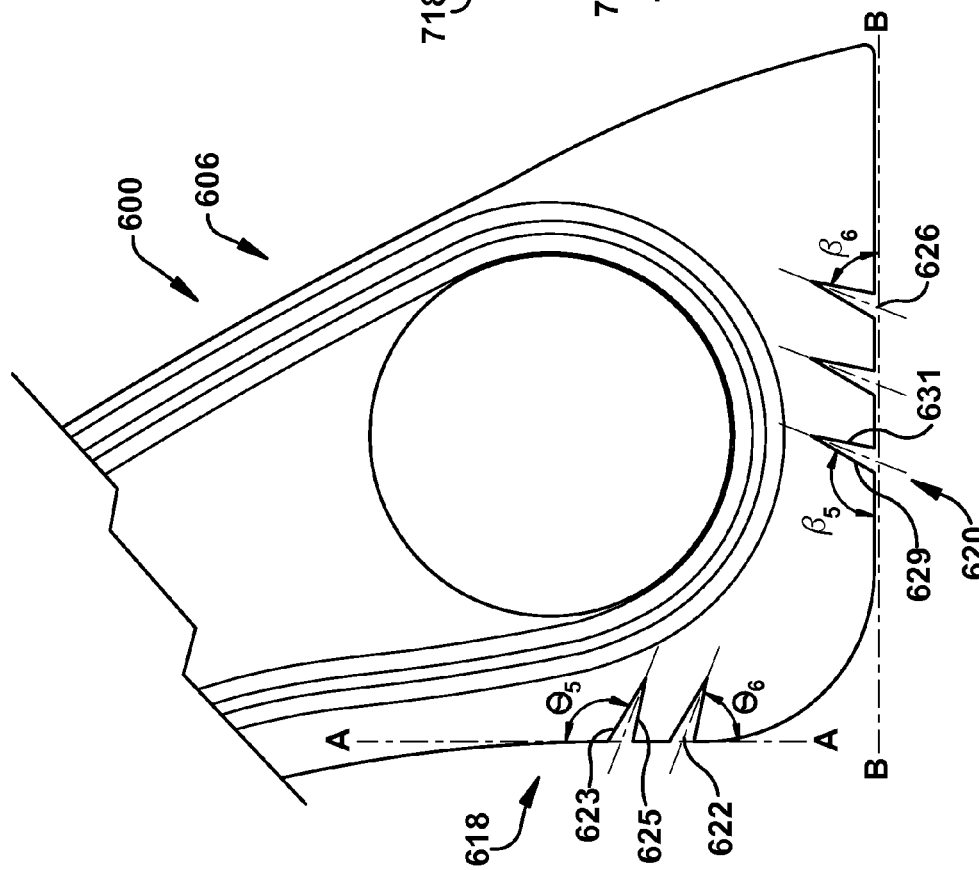

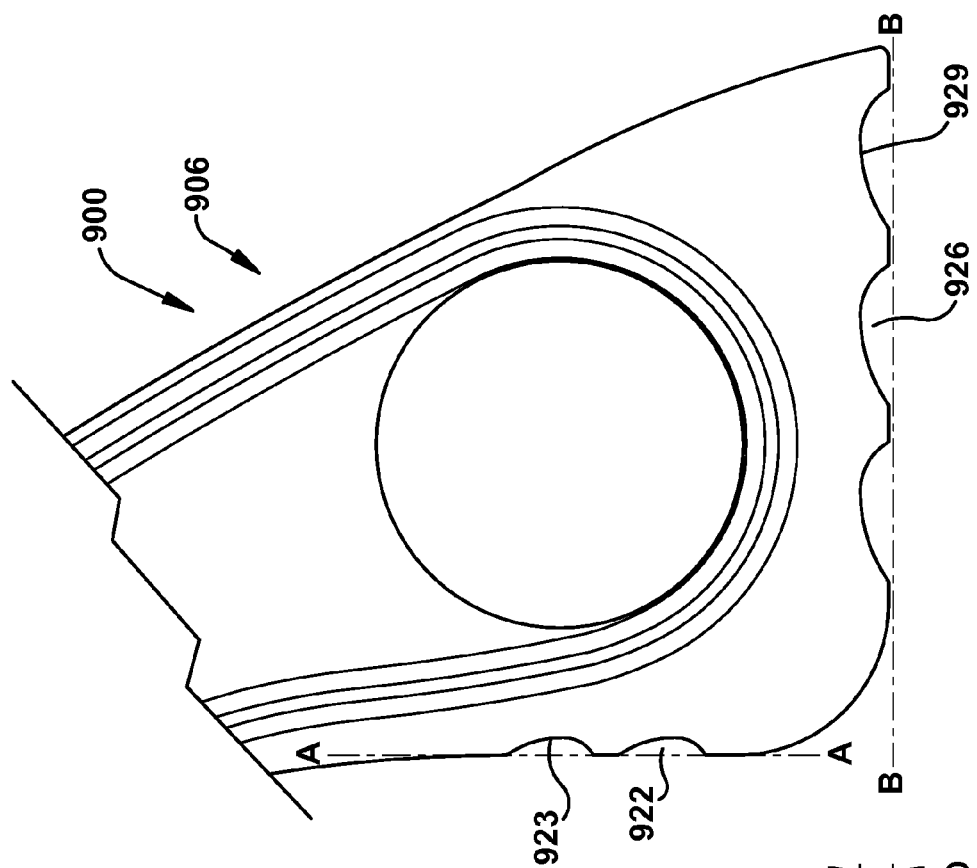
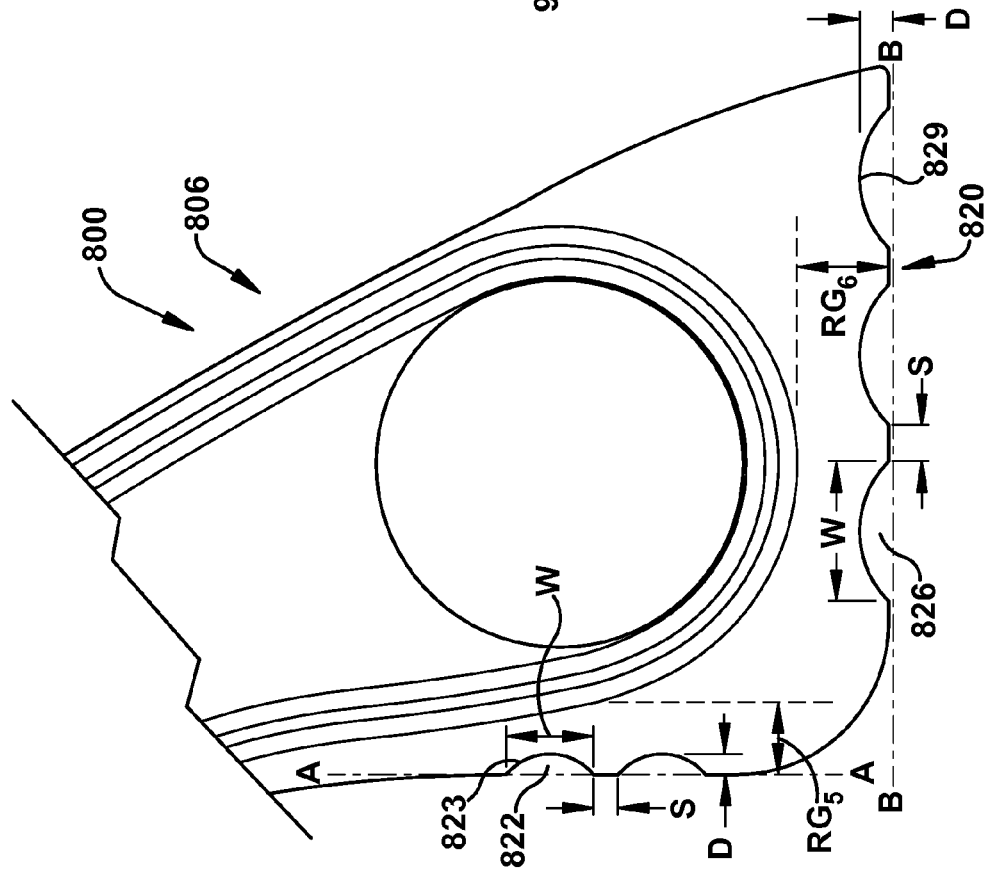
Figure 9
Figure 8

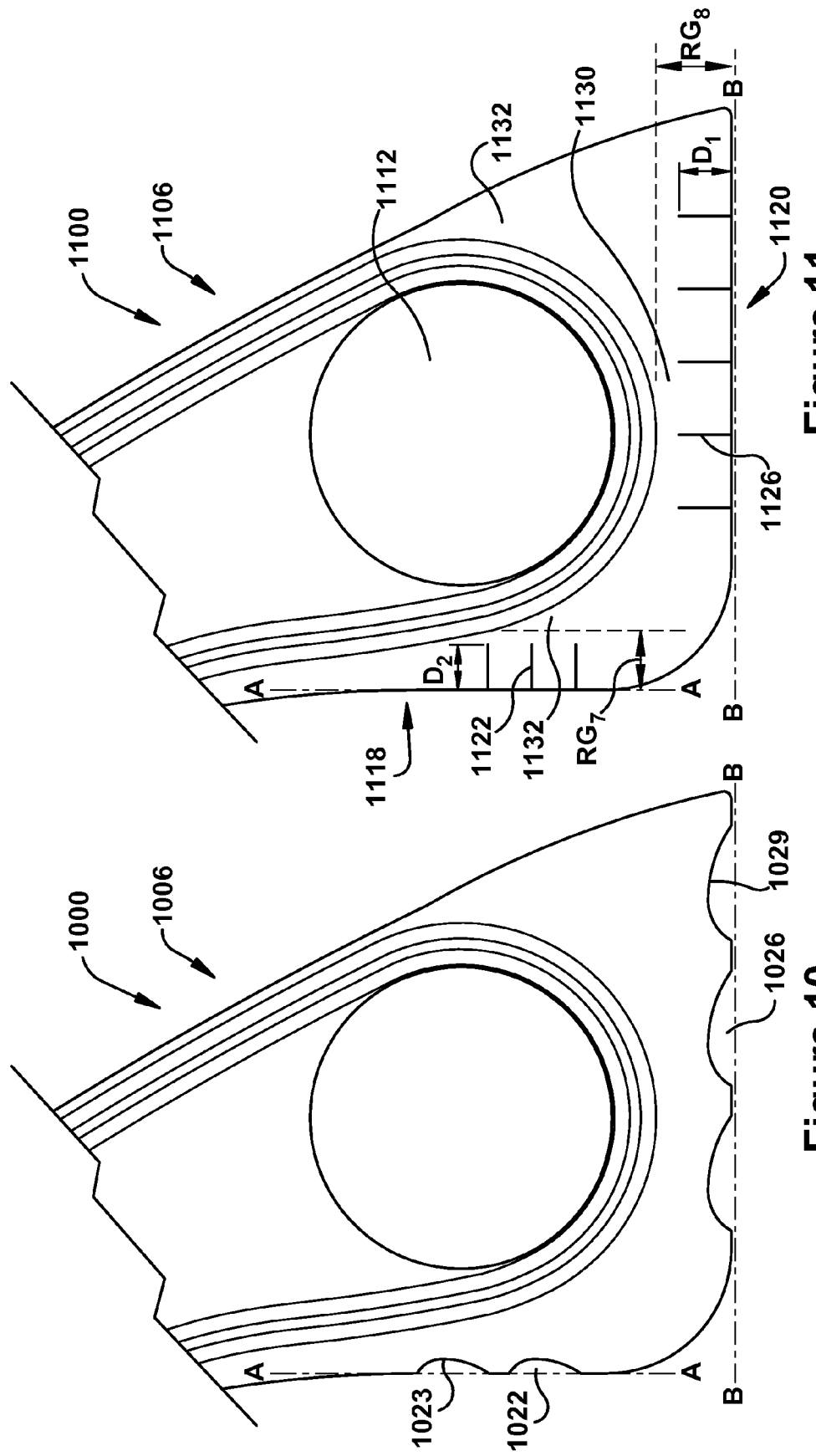

TIRE WITH CIRCUMFERENTIAL GROOVES IN THE BEAD REGION

FIELD OF INVENTION

The present application is directed to a tire having a modified bead region. More specifically, the present application relates to a tire that has at least one circumferential continuous groove along the bead region of the tire.

BACKGROUND

The bead portion of the tire transfers the load of the vehicle from the vehicle wheel rim to the tire. The contact at the bead region of the tire and the wheel rim interface impacts tire and rim performance. Various design characteristics in the bead region of the tire have been employed to increase the friction at the tire and rim interface.

SUMMARY

In one embodiment, a tire comprising a circumferential tread, at least one circumferential belt, at least one carcass ply, a pair of sidewalls, and a pair of bead portions. Each of the bead portions comprising a bead core, a bead filler, a toe region, a heel region, a ledge region, and a flange region. The ledge region is provided between the toe region and the heel region, wherein the ledge region comprises at least one circumferentially continuous groove having at least one substantially planar surface. The flange region each extending circumferentially about the tire, the flange region provided radially above the ledge region, wherein the flange region comprises at least one circumferentially continuous groove having at least one substantially planar surface.

In another embodiment, a tire comprising a circumferential tread, at least one circumferential belt, at least one carcass ply, a pair of sidewalls, and a pair of bead portions. Each of the bead portions comprising a bead core, a bead filler, a toe region, a heel region, a ledge region, and a flange region. The ledge region is provided between the toe region and the heel region, wherein the ledge region comprises at least one circumferentially continuous arcuately shaped groove. The flange region each extending circumferentially about the tire, the flange region provided radially above the ledge region, wherein the flange region comprises at least one circumferentially continuous arcuately shaped groove.

BRIEF DESCRIPTION OF THE DRAWINGS

Various embodiments of a tire with circumferential grooves in the bead region are illustrated and described below. It will be appreciated that the illustrated boundaries of elements in the drawings represent one or more examples of the boundaries. One of ordinary skill in the art will appreciate that an element or step may be designed as multiple elements or steps or that multiple elements or steps may be designed as a single element or step. An element shown as an internal component of another element may be implemented as an external component and vice-versa.

Further, in the accompanying drawings and description that follow, like parts are indicated throughout the drawings and description with the same reference numerals, respectively. The figures are not drawn to scale and the proportions of certain parts have been exaggerated for convenience of illustration.

FIG. 4 is a cross-sectional illustration of a bead portion 406 of a tire 400, according to an embodiment of the present invention;

FIG. 5 is a cross-sectional illustration of a bead portion 506 of a tire 500 having triangular shaped grooves, according to an embodiment of the present invention;

FIG. 6 is a cross-sectional illustration of a bead portion 606 of a tire 600, according to an embodiment of the present invention;

FIG. 7 is a cross-sectional illustration of a bead portion 706 of a tire 700, according to an embodiment of the present invention;

FIG. 8 is a cross-sectional illustration of a bead portion 806 of a tire 800 having arcuate shaped grooves, according to an embodiment of the present invention;

FIG. 9 is a cross-sectional illustration of a bead portion 906 of a tire 900, according to an embodiment of the present invention;

FIG. 10 is a cross-sectional illustration of a bead portion 1006 of a tire 1000, according to an embodiment of the present invention;

FIG. 11 is a cross-sectional illustration of a bead portion 1106 of a tire 1100 with at least one slit groove, according to an embodiment of the present invention;

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Bead" and "bead region" refer to the part of the tire that contacts the wheel and defines a boundary of the sidewall.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Lateral" and "laterally" refer to a direction along the tread of the tire going from one sidewall of a tire to the other sidewall.

"Radial" and "radially" refer to a direction perpendicular to the axis of rotation of a tire.

"Sidewall" refers to that portion of the tire between the tread and the bead.

"Tire designer" refers to at least one of the following: an engineer, a technician, a designer, a consultant, a manager, a computer, and a computer program that can create a new tire design or modify an existing design.

"Tread" refers to that portion of the tire that comes into contact with the road under normal inflation and load.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
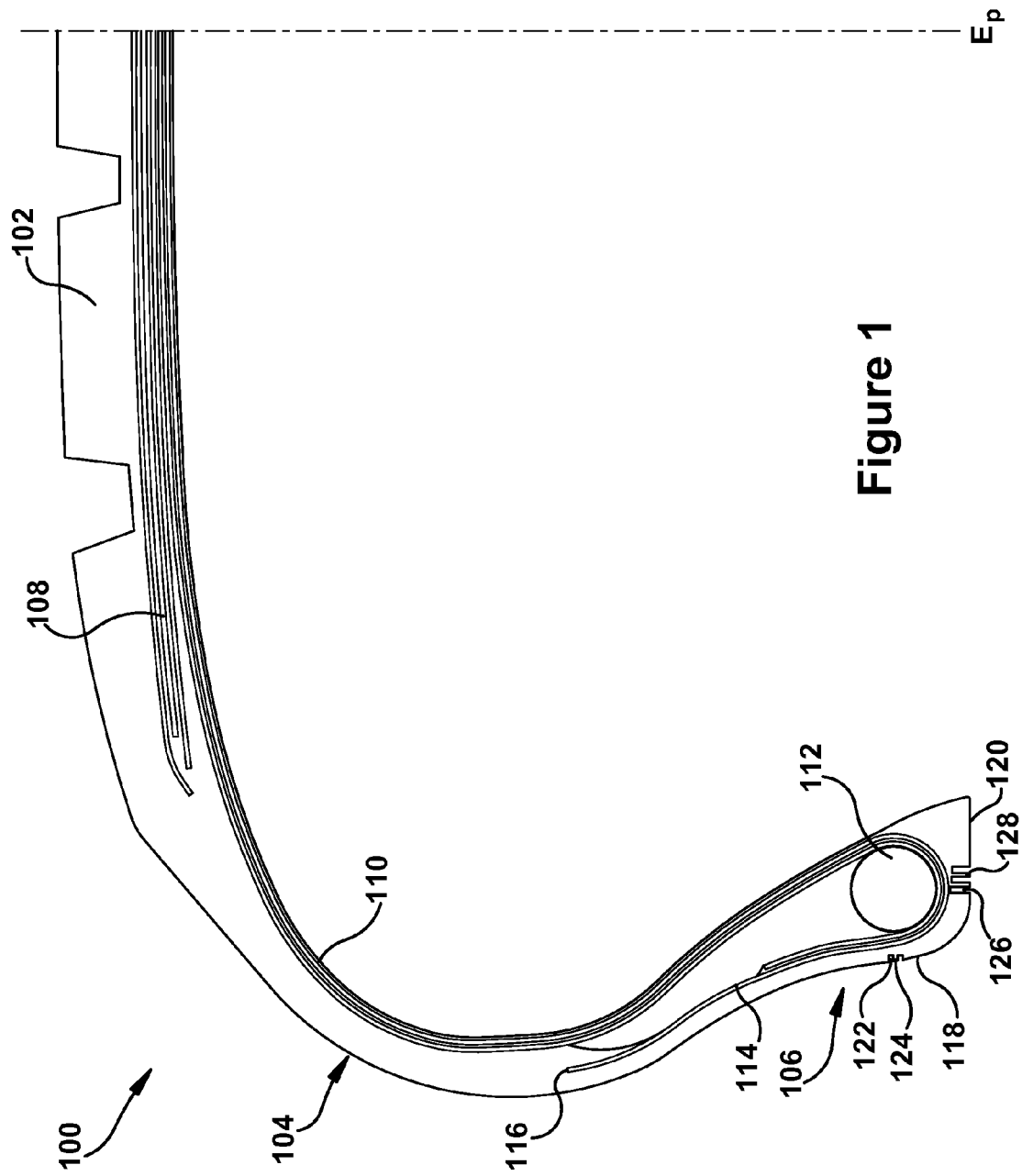
FIG. 1 is a cross-sectional view of half of a tire 100 and bead portion 106 with at least one rectangular groove, according to an embodiment of the present invention.

FIG. 1 illustrates a cross-sectional view of half of one embodiment of a tire 100, according to an embodiment of the present invention. Although only half of the tire 100 is depicted in the drawings, it will be appreciated that the other half of the tire 100 is a substantial mirror image of the half depicted. The tire 100 has an equatorial plane $E_p$ and includes a tread 102, a sidewall 104, a bead portion 106, a belt portion 108, and at least one carcass ply 110 that extends circumferentially about the tire 100 from one bead portion 106 to the other bead portion (not shown). The at least one carcass ply 110 is wound outwardly about a bead core 112 and extends upwardly towards the tread 102 to form at least one turn-up portion 114. The at least one turn-up portion 114 terminates at a turn-up end 116. Although the tire 100 illustrated in FIG. 1 includes two carcass plies, the tire 100 can alternatively include one or more carcass plies.

In the illustrated embodiment, bead portion 106 includes a flange region 118 and a ledge region 120. As one of ordinary skill in the art would understand, the flange region 118 is disposed axially outward of the bead core 112 and forms a substantially planar or substantially frustoconical annular surface. As one of ordinary skill in the art would also understand, the ledge region 120 is disposed radially inward of the bead core 112 and forms a substantially cylindrical or substantially frustoconical annular surface. In one embodiment, flange region 118 includes at least one circumferentially continuous groove, for example, a plurality of circumferentially continuous grooves 122 that form a plurality of circumferentially continuous ribs 124. In another embodiment, ledge region 120 includes at least one circumferentially continuous groove, for example, a plurality of circumferentially continuous grooves 126 that form a plurality of circumferentially continuous ribs 128. In an alternative embodiment, only the flange region 118 or only the ledge region 120 contain at least one circumferentially continuous groove. As discussed further below, a tire designer can configure the grooves in the flange region 118, the ledge region 120, or both, to improve contact at the tire and rim interface of a tire and rim assembly. For example, various groove configurations include but are not limited to, groove dimensions, number, angles, spacing, grouping, cross sections, and the like.

Figure 2:
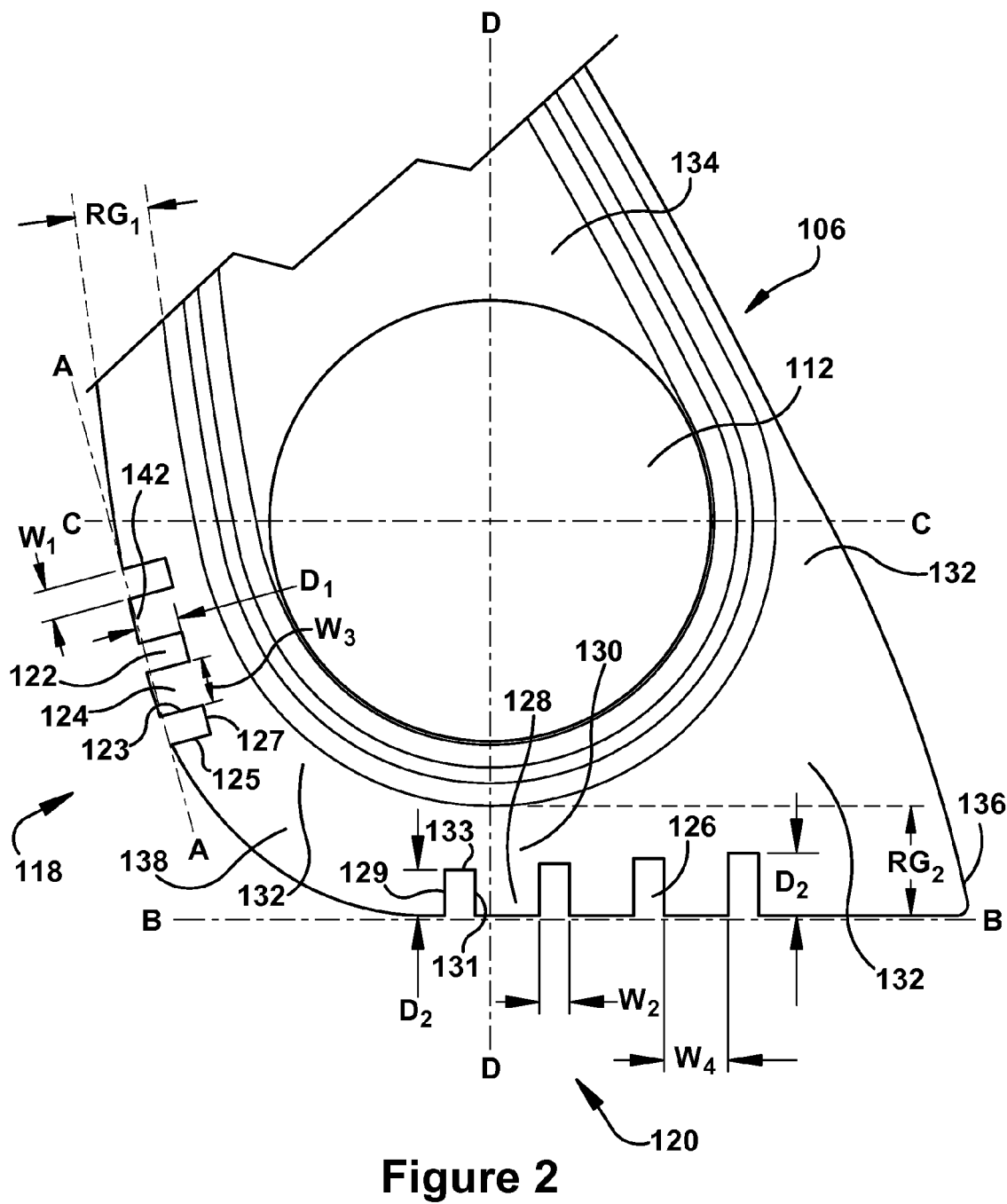
FIG. 2 is a cross-sectional illustration of an enlarged bead portion 106 of tire 100 of FIG. 1, depicting a bead portion 106 in greater detail, according to an embodiment of the present invention.

Illustrated in FIG. 2 is an enlarged cross-sectional view of bead portion 106 of tire 100 of FIG. 1. Bead portion 106 includes a lower bead portion 130, two side bead portions 132, a bead filler 134, a toe region 136, a heel region 138, and bead core 112. As one of ordinary skill in the art would understand, the toe region 136 forms an annular surface that connects the annular surface of the ledge region 120 to an inner peripheral surface of the tire 100. As one of ordinary skill in the art would further understand, the heel region 138 forms an annular surface that connects the annular surface of the ledge region 120 to the annular surface of the flange region 118. Accordingly, the flange region 118 and plurality of circumferentially continuous grooves 122 are radially above heel region 138. Ledge region 120 and plurality of circumferentially continuous grooves 126 are located laterally between toe region 136 and heel region 138 and are located radially below bead core 112.

Plurality of circumferentially continuous grooves 122 in flange region 118 each have a width, for example, $W_1$ and a depth, for example, $D_1$. Plurality of circumferentially continuous grooves 126 in ledge region 120 each have a width, for example, $W_2$ and a depth, for example, $D_2$. Width $W_1$ and width $W_2$ can vary in dimension from one another and depth $D_1$ and depth $D_2$ can vary in dimension from one another to meet the tire design criterion. Plurality of circumferentially continuous grooves 122 in flange region 118 and plurality of circumferentially continuous grooves 126 in ledge region 120 each have a width ($W_1$, $W_2$) that ranges from about 1 millimeter to about 4 millimeters. The grooves in the ledge region can each have a depth, for example ($D_1$, $D_2$), that varies up to about 0.5 millimeter, in another embodiment, a depth that ranges from about 0.2 millimeter up to about 2 millimeters, in another embodiment, from about 0.1 millimeter up to about 1.5 millimeters, and in yet another embodiment, from about 1 millimeter up to about 5 millimeters. In yet another embodiment, the depth ($D_1$, $D_2$) can range from about 10% to about 80% of a rubber gauge ($RG_1$, $RG_2$).

In another embodiment, plurality of circumferentially continuous grooves 122 in flange region 118 and plurality of circumferentially continuous grooves 126 in ledge region 120 each have a depth of up to about 80% of the radial distance between the bead core and an outer surface of the bead portion, e.g., the flange region 118 or the ledge region 120, 80% of the rubber gauge ($RG_1$, $RG_2$). In yet another embodiment, plurality of circumferentially continuous grooves 122 in flange region 118 and plurality of circumferentially continuous grooves 126 in ledge region 120 each have a width ($W_1$, $W_2$) that ranges from about 1.0 millimeters to about 4.0 millimeters, in another embodiment, from about 1.5 millimeters to about 3.0 millimeters, and in yet another embodiment, from about 2.0 millimeters to about 2.5 millimeters.

The plurality of circumferentially continuous ribs 124 in flange region 118 and plurality of circumferentially continuous ribs 128 in ledge region 120 each have a width $W_3$ and a width $W_4$, respectively, each of which can range from about 1 millimeter to about 10 millimeters, in another embodiment, from about 2 millimeters up to about 5 millimeters, and in yet another embodiment, from about 0.5 millimeters up to about 3 millimeters, and each have a depth of up to about 0.5 millimeter.

In another embodiment, plurality of circumferentially continuous ribs 124 in flange region 118 and plurality of circumferentially continuous ribs 128 in ledge region 120 have a width $W_3$ and a width $W_4$, respectively, that can each range from about 0.5 millimeters up to about 10 millimeters and each have a depth ($D_1$ and $D_2$) from about 0.1 millimeter up to about 2 millimeters. In yet another embodiment, depth ($D_1$ and $D_2$) range from about 2 millimeters to about 3 millimeters, in another embodiment, depth ($D_1$ and $D_2$) range from about 1 millimeter to about 2 millimeters. In another embodiment, a width $W_3$ and a width $W_4$ can each range from about 0.5 millimeters up to about 5 millimeters and each have a depth ($D_1$ and $D_2$) from about 2.0 millimeter up to about 5 millimeters, in another embodiment, a width $W_3$ and a width $W_4$ can each range from about 1 millimeter up to about 3 millimeters, and in yet another embodiment, a width $W_3$ and a width $W_4$ can each range from about 2 millimeters up to about 5 millimeters.

In the illustrated embodiment, the flange region 118 includes three circumferentially continuous grooves 122 and the ledge region 120 includes four circumferentially continuous grooves 126. Alternatively, the number of plurality of circumferentially continuous grooves 122 and the number of plurality of circumferentially continuous grooves 126 can be greater or lesser than the number illustrated in FIG. 2. For example, the number of circumferentially continuous grooves in the flange region 118 can range from about one to ten, in another embodiment from about one to seven, and in yet another embodiment from about one to five. The number of circumferentially continuous grooves in ledge region 120 can range from about one to ten, in another embodiment from about one to seven, and in yet another embodiment from about one to five.

The plurality of circumferentially continuous grooves 122 in flange region 118 as shown are generally rectangular in shape. The grooves 122 have a first surface 123 (e.g., a first wall) and a second surface 125 (e.g., a second wall) substantially perpendicular to a line A-A that is tangential to the outside surface of the flange region 118 and have a third surface 127 (e.g., a third wall) substantially parallel to line A-A. In other words, the circumferentially continuous grooves 122 have multiple surfaces comprising substantially planar sections. In other embodiments, the plurality of circumferentially continuous grooves 122 in the flange regions 118 have cross sections comprising a plurality of surfaces that form in the shape of portions of a polygon, for example, a portion of a pentagon, a portion of a hexagon, and the like. In another embodiment, circumferentially continuous grooves 122 do not include both straight portions and curved portions.

The embodiment of FIG. 2 shows plurality of circumferentially continuous grooves 126 in ledge region 120 are generally rectangular in shape. The grooves have a first surface 129 and a second surface 131 that are each perpendicular to a line B-B tangential to the outside surface of ledge region 120 and a third surface 133 substantially parallel to line B-B. In other words, circumferentially continuous grooves 126 have multiple surfaces comprising substantially planar sections. In other embodiments, the plurality of circumferentially continuous grooves 126 in the ledge region 120 have cross sections comprising a plurality of surfaces that form in the shape of portions of a polygon, for example, a portion of a pentagon, a portion of a hexagon, and the like. In another embodiment, circumferentially continuous grooves 126 do not include both straight portions and curved portions.

In the illustrated embodiment, the plurality of circumferentially continuous grooves 122 in flange region 118 and the plurality of circumferentially continuous grooves 126 in ledge region 120 are about equally spaced radially and laterally, respectively, and are in a single group so circumferentially continuous ribs 124 and circumferentially continuous ribs 126 have about the same widths, $W_1$ and $W_2$, respectively. Further, the circumferentially continuous grooves 126 in ledge region 120 are laterally located inward at least 2 millimeters from the toe region 136 and at least 2 millimeters from the heel region 138. Alternatively, plurality of circumferentially continuous grooves 122 in flange region 118 and plurality of circumferentially continuous grooves 126 in ledge region 120 are not equally spaced apart or they are in multiple groups so that the circumferentially continuous ribs 124 and circumferentially continuous ribs 126 do not have the same width.

Lower bead portion 130 and side bead portions 132 are made from material with a JIS hardness from about 85 and about 91 or are made from a material with a JIS hardness from about 91 and about 98, but not made from two different materials with different JIS hardnesses. In another embodiment, tire 100 does not include a reinforcement ply in either the lower bead portion 130 or side bead portions 132.

Tire designers can configure the location of the circumferentially continuous grooves 122 in the flange region 118 and the circumferentially continuous grooves 126 in the ledge region 120 to prevent slippage of the bead portion 106 (relative to the rim) by increasing friction force between the bead portion 106 and the rim. Friction force is the product of a coefficient of friction of the tire material and a normal force between the tire and rim. A tire designer can configure plurality of circumferentially continuous grooves 122 in flange region 118 and plurality of circumferentially continuous grooves 126 in ledge region 120 to prevent slippage or improve contact between the tire and rim by increasing the coefficient of friction, by increasing the normal force, or by increasing both the coefficient of friction and the normal force.

Figure 3:
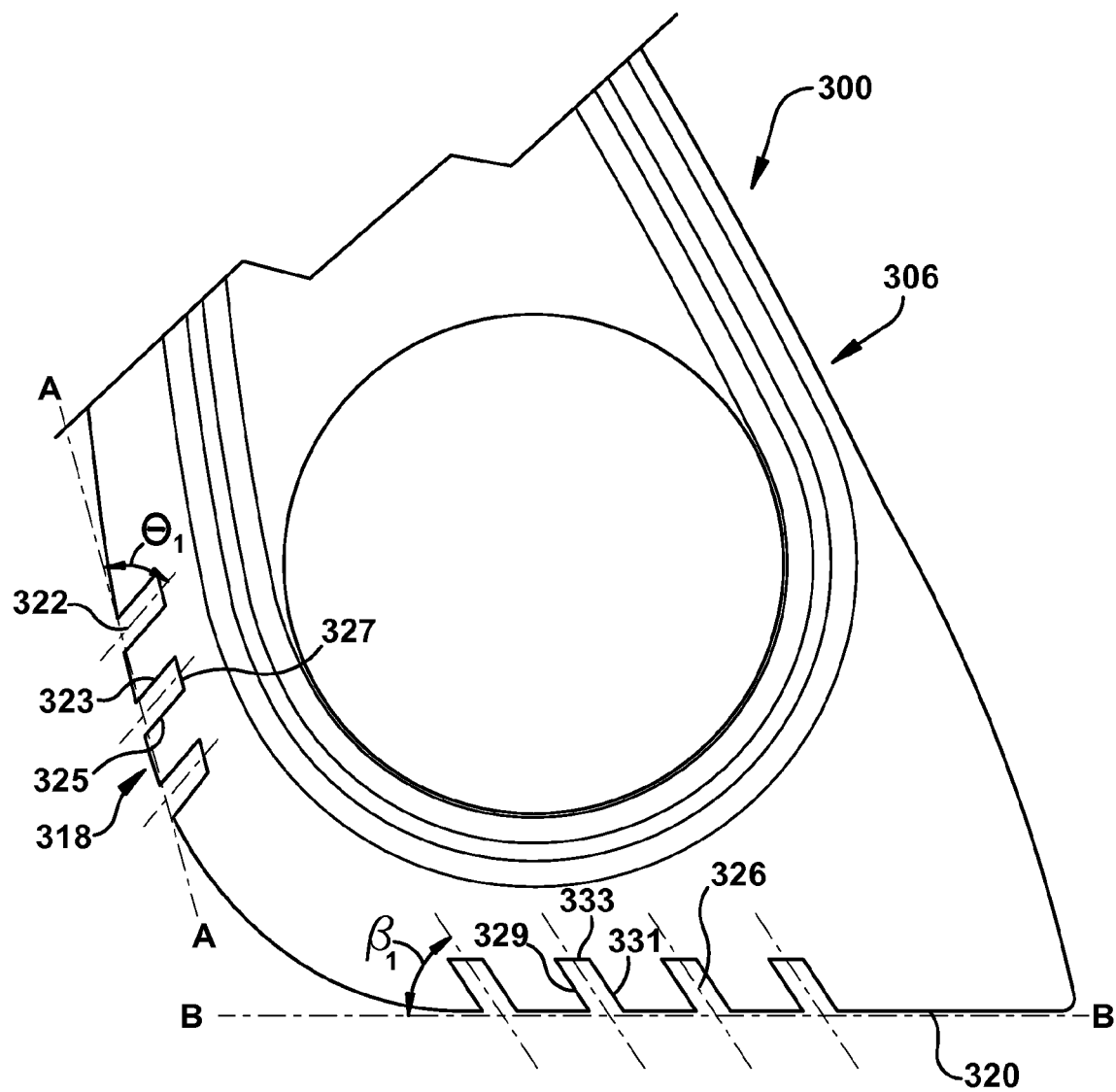
FIG. 3 is a cross-sectional illustration of a bead portion 306 of a tire 300, according to an embodiment of the present invention.

FIG. 3 is a cross-sectional illustration of a bead portion 306 of a tire 300, according to an example embodiment of the present invention, depicting bead portion 306 in detail. Tire 300 is substantially similar to tire 100, except tire 300 includes circumferentially continuous grooves 322 in a flange region 318 that are angled relative to (not substantially perpendicular to) a line A-A tangential to the outside surface of the flange region 318, and includes circumferentially continuous grooves 326 in a ledge region 320 that are angled relative to (not substantially perpendicular to) a line B-B tangential to the outside surface of the flange region 320. Circumferentially continuous grooves 322 in flange region 318 have a first surface 323 and a second surface 325 that are each at an acute angle $\theta_1$ (at an angle slanted away from the heel) relative to line A-A drawn along the outside surface of the flange region 318 and circumferentially continuous grooves 326 in ledge region 320 have a first surface 329 and a second surface 331 that are each at are at an acute angle $\beta_1$ (at an angle slanted away from the toe) relative to line B-B drawn along the outside surface of the ledge region 320. In one embodiment, the first surface 323, second surface 325, first surface 329, and second surface 331 are each at an angle $\theta_1$, $\beta_1$ that ranges from about 15 degrees to about 90 degrees. In another embodiment, the surfaces are each at an angle $\theta_1$, $\beta_1$ that ranges from about 30 degrees to about 90 degrees. In another embodiment, the surfaces are each at an angle $\theta_1$, $\beta_1$ that ranges from about 45 degrees to about 60 degrees.

FIG. 4 is a cross-sectional illustration of a bead portion 406 of a tire 400, according to an embodiment of the present invention. Tire 400 is substantially similar to tire 300, except tire 400 includes circumferentially continuous grooves 422 each having a first surface 423 and a second surface 425 that are each at an obtuse angle $\theta_2$ (at an angle slanted towards the heel) relative to line A-A drawn along the outside surface of the flange region 418 and includes circumferentially continuous grooves 426 each having a first surface 429 and a second surface 431 that are each at an obtuse angle $\beta_2$ (at an angle slanted towards the toe) relative to line B-B drawn along the outside surface of the ledge region 420. In one embodiment, angle $\theta_2$ and angle $\beta_2$ range from about 90 degree and about 170 degrees, in another embodiment, from about 90 degrees to about 150 degrees, and in another embodiment, from about 120 degrees to about 145 degrees. In yet another embodiment, the circumferentially continuous grooves 422 and the circumferentially continuous grooves 426 and their respective surfaces can each be at an angle relative to the line A-A and the line B-B, respectively, either at an acute angle or an obtuse angle. In another embodiment, circumferentially continuous grooves 422 and circumferentially continuous grooves 426 do not include both straight portions and curved portions.

FIG. 5 illustrates an enlarged cross-sectional view of a portion of a tire 500 depicting a bead portion 506, according to an example embodiment of the present invention. Tire 500 is substantially similar to tire 100, except that tire 500 includes circumferentially continuous grooves 522 and circumferentially continuous grooves 526 that have substantially triangular cross sections each with surfaces 523 and 525 and each with surfaces 529 and 531, respectively, because the surfaces are at an angle relative to line A-A and line B-B, respectively. The surfaces 523 and 525 and surfaces 529 and 531 include substantially planar surfaces that contact one another at angles that form triangle portions. The surfaces 523 and 525 and surfaces 529 and 531 do not include straight surfaces in combination with curved surfaces. In the illustrated embodiment, surface 523 is at an obtuse angle $\theta_3$ (at an angle slanted towards the heel) relative to line A-A drawn along the outside surface of a flange region 518 and surface 529 is at an obtuse angle $\beta_3$ (at an angle slanted towards the toe) relative to the line B-B drawn along the outside surface of the ledge region 520. In one embodiment, angle $\theta_3$ and angle $\beta_3$ range from about 90 degrees to about 170 degrees, and in another embodiment, from about 100 degrees to about 160 degrees.

In the illustrated embodiment, surface 525 is at an obtuse angle $\theta_4$ (at an angle slanted away from the heel) relative to line A-A drawn along the outside surface of a flange region 518 and surface 531 is at an obtuse angle $\beta_4$ (at an angle slanted towards the heel) relative to the line B-B drawn along the outside surface of the ledge region 520. In one embodiment, surface 525 and surface 531 are each at an angle that ranges from about 90 degrees to about 170 degrees. In another embodiment, surface 525 and surface 531 are each at an angle that ranges from about 100 degrees to about 160 degrees.

In the illustrated example embodiment of FIG. 5, a substantially planar surface 523 of the flange region 518 is oriented at an angle $\theta_3$ that ranges from greater than zero to up to about 180 degrees relative to a line A-A tangent to the flange region, and the at least one circumferentially continuous groove 522 in the flange region 518 further comprises surface 525 that is oriented at an angle of less than about 70 degrees relative to the surface 523. A substantially planar surface 529 of the ledge region 520 is oriented at an angle $\beta_3$ that ranges from greater than zero to up to about 180 degrees relative to a line B-B tangent to the ledge region, and the at least one circumferentially continuous groove 526 in the ledge region 520 further comprises a second substantially planar surface 531 that is oriented at an angle of less than about 70 degrees relative to the surface 529. In another example embodiment, surface 525 is oriented at an angle of less than about 120 degrees relative to the surface 523 and surface 531 is oriented at an angle of less than about 120 degrees relative to the surface 529. In yet another example embodiment, surface 525 is oriented at an angle of less than about 50 degrees relative to the surface 523 and surface 531 is oriented at an angle of less than about 50 degrees relative to the surface 529. In another example embodiment, surface 525 is oriented at an angle of less than about 150 degrees relative to the surface 523 and surface 531 is oriented at an angle of less than about 150 degrees relative to the surface 529.

In the illustrated embodiment, depths of circumferentially continuous grooves 522 and circumferentially continuous grooves 526 can be from about 1 millimeter to about 5 millimeters. In another embodiment, depths of circumferentially continuous grooves 522 and circumferentially continuous grooves 526 can be from about 10% to about 80% of a rubber gauge ($RG_3$, $RG_4$).

FIG. 6 illustrates an enlarged cross-sectional view of a surface of a tire 600 depicting a bead portion 606, according to an example embodiment of the present invention. Tire 600 is substantially identical to tire 500 of FIG. 5, except that tire 600 includes circumferentially continuous grooves 622 and circumferentially continuous grooves 626 that have substantially triangular cross sections with surfaces 623 and 625 and surfaces 629 and 631, respectively, which have unequal lengths. Since surfaces 623 and 625 do not have equal lengths, circumferentially continuous grooves 622 are slanted radially inward (towards the heel) and since surfaces 629 and 631 do not have equal lengths, circumferentially continuous grooves 626 are slanted axially inward (away from the heel). In another embodiment, circumferentially continuous grooves 622 and circumferentially continuous grooves 626 do not include both straight portions and curved portions.

In the illustrated embodiment, surface 623 is at an obtuse angle $\theta_5$ (at an angle slanted towards the heel) relative to line A-A drawn along the outside surface of a flange region 618 and surface 629 is at an obtuse angle $\beta_5$ (at an angle slanted away from the heel) relative to the line B-B drawn along the outside surface of the ledge region 620. In one embodiment, surface angle $\theta_5$ and angle $\beta_5$ range from about 90 degrees to about 170 degrees, in another embodiment, from about 100 degrees to about 160 degrees. In another embodiment, surface 623 and surface 629 are at different angles that range from about 100 degrees to about 160 degrees relative to the respective tangent lines. In the illustrated embodiment, surface 625 is at an acute angle $\theta_6$ (at an angle slanted towards the heel) relative to line A-A drawn along the outside surface of a flange region 618 and surface 631 is at an acute angle $\beta_6$ (at an angle slanted away from the heel) relative to the line B-B drawn along the outside surface of a ledge region 620. In one embodiment, angle $\theta_6$ and angle $\beta_6$ range from about 0 degrees to about 90 degrees, in another embodiment, from about 15 degrees to about 75 degrees. In another embodiment, surface 631 and surface 625 are at different angles that range from about 0 degrees to about 90 degrees.

FIG. 7 illustrates an enlarged cross-sectional view of a portion of a tire 700 depicting a bead portion 706, according to an embodiment of the present invention. Tire 700 is substantially similar to tire 600 of FIG. 6, except that tire 700 includes circumferentially continuous grooves 722 slanted radially outward (at an angle slanted away from the heel) and circumferentially continuous grooves 726 slanted axially outward (at an angle slanted towards the heel). In another embodiment, circumferentially continuous grooves 722 and circumferentially continuous grooves 726 do not include both straight portions and curved portions.

In the illustrated embodiment, surface 723 is at an acute angle $\theta_7$ (at an angle slanted away from the heel) relative to line A-A drawn along the outside surface of a flange region 718 and surface 729 is at an acute angle $\beta_7$ (at an angle slanted towards the heel) relative to the line B-B drawn along the outside surface of the ledge region 720. In one embodiment, surface 723 and surface 729 are each at an angle that ranges from about 0 degree to about 90 degrees. In another embodiment, surface 723 and surface 729 are each at an angle from about 15 degrees to about 80 degrees. In another embodiment, surface 723 and surface 729 are at different angles from about 15 degrees to about 80 degrees. In the illustrated embodiment, surface 725 is at an obtuse angle $\theta_8$ (at an angle slanted away from the heel) relative to line A-A drawn along the outside surface of a flange region 718 and surface 731 is at an obtuse angle $\beta_8$ (at an angle slanted towards the heel) relative to the line B-B drawn along the outside surface of a ledge region 720. In one embodiment, surface 731 and surface 725 are each at an angle that ranges from about 90 degrees to about 180 degrees. In another embodiment, surface 731 and surface 725 are each at an angle from about 105 degrees to about 165 degrees. In another embodiment, surface 731 and surface 725 are at different angles that range from about 105 degrees to about 165 degrees.

FIG. 8 illustrates an enlarged cross-sectional view of a portion of a tire 800 depicting a bead portion 806, according to an example embodiment of the present invention. Tire 800 is substantially similar to tire 100, except that tire 800 includes circumferentially continuous grooves 822 and circumferentially continuous grooves 826 that have arcuate shaped cross sections defined by surfaces 823 along the flange region and 829 along the ledge region, respectively. The surfaces 823 and 829 comprise at least one of the following partial surfaces: curved, circular, elliptical, parabolic, and polynomial. In the illustrated embodiment, bead portion 806 includes two grooves 822 with surfaces 823 each having a partial elliptical surface and three grooves 826 with surfaces 829 each having a partial elliptical surface. In another embodiment, the number of surfaces 823 and the number of surfaces 829 can be greater or lesser than the number illustrated in FIG. 8. In another embodiment, the surfaces 823 and 829 do not include curved surfaces in combination with straight surfaces.

In the illustrated embodiment, depth D of the circumferentially continuous grooves 822 and the circumferentially continuous grooves 826 can range from about 0.1 millimeter to about 4 millimeters, width W of the circumferentially continuous grooves 822 and the circumferentially continuous grooves 826 can range from about 1 millimeter to about 10 millimeters, and spacing S between adjacent circumferentially continuous grooves 822 and adjacent circumferentially continuous grooves 826 can range from about 1 millimeter to about 10 millimeters. In another embodiment, depth D of the circumferentially continuous grooves 822 and depth D of the circumferentially continuous grooves 826 can vary relative to one another and each can range from about 10% to about 80% of a rubber gauge ($RG_5$, $RG_6$).

FIG. 9 illustrates an enlarged cross-sectional view of a portion of a tire 900 depicting a bead portion 906, according to an example embodiment of the present invention. Tire 900 is substantially similar to tire 800, except that tire 900 includes circumferentially continuous surfaces 923 that are slanted radially inward (slanted towards the heel) and circumferentially continuous surfaces 929 that are slanted axially inward (slanted away from the heel). FIG. 10 illustrates an enlarged cross-sectional view of a portion of a tire 1000 depicting a bead portion 1006, according to an example embodiment of the present invention. Tire 1000 is substantially identical to tire 800, except that tire 1000 includes circumferentially continuous surfaces 1023 that are slanted radially outward (slanted away from the heel) and circumferentially continuous surfaces 1029 that are slanted axially outward (slanted towards the heel).

FIG. 11 illustrates an enlarged cross-sectional view of a portion of a tire 1100 depicting a bead portion 1106, according to an embodiment of the present invention. Tire 1100 is substantially identical to tire 100, except that tire 1100 includes circumferentially continuous slits 1122 in a flange region 1118 and circumferentially continuous slits 1126 in a ledge region 1120. Circumferentially continuous slits 1122 in flange region 1118 and circumferentially continuous slits 1126 in ledge region 1120 have a width that ranges from about 0.1 millimeter to about 1.0 millimeter. In another embodiment, circumferentially continuous slits 1122 and 1126 are either only in the flange region 1118 or in ledge region 1120. Similar to the circumferentially continuous grooves, discussed above, a tire designer can configure circumferentially continuous slits 1122 and 1126 in the flange region 1118 or the ledge region 1120, respectively, to improve contact at the tire and rim interface of a tire and rim assembly, including but not limited to at least one of the following design configurations: dimensions, number, angles, spacing, grouping, and the like.

In the illustrated embodiment, circumferentially continuous slits 1122 in a flange region 1118 can have a depth $D_2$ of about 0.5 millimeter to about 80% of the radial distance between bead core 1112 and an outer surface of flange region 1118, e.g., from about 10% to about 80% the rubber gauge, $RG_7$, in the flange region. Circumferentially continuous slits 1126 in ledge region 1120 can have a depth $D_1$ of about 0.5 millimeter to about 80% of the axial distance between bead core 1112 and an outer surface of ledge region 1120. Alternatively, depth $D_1$ is about 80% the thickness of lower bead portion 1130 or the rubber gage, for example $RG_8$, under the bead core 1112 and depth $D_2$ is about 80% the thickness T2 of side bead portion 1132 or the rubber gage (e.g., $RG_7$) on the side of the bead core 1112.

Figure 12:
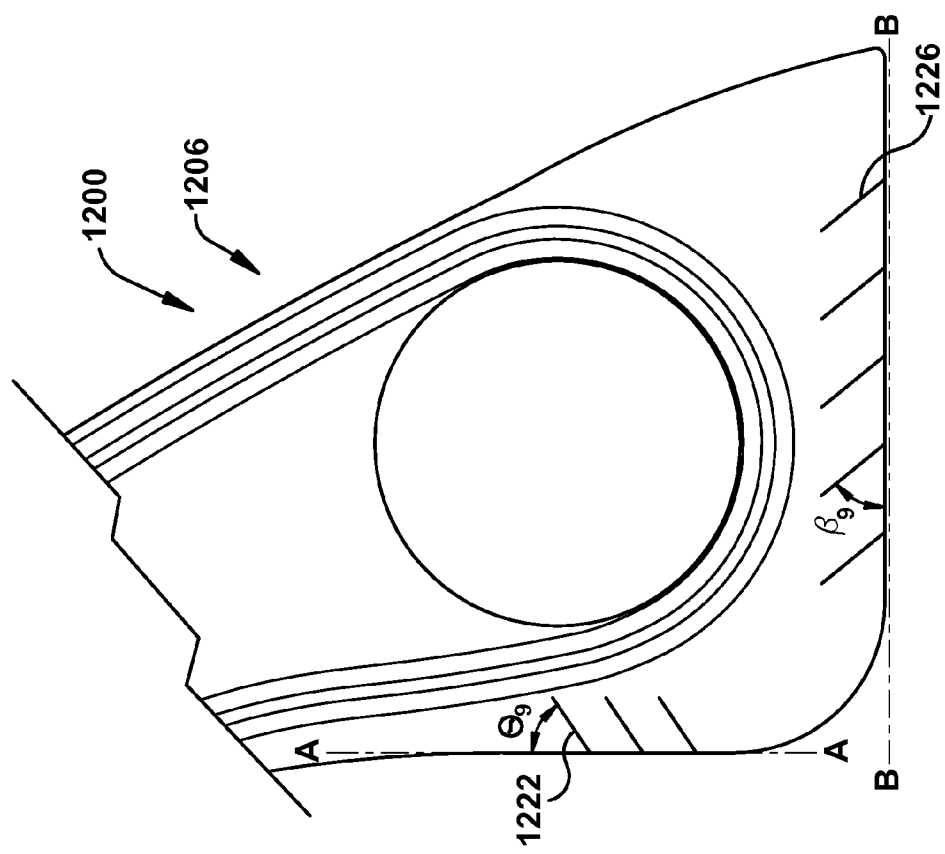
FIG. 12 is a cross-sectional illustration of a bead portion 1206 of a tire 1200, according to an embodiment of the present invention.

FIG. 12 illustrates an enlarged cross-sectional view of a portion of a tire 1200 depicting a bead portion 1206, according to an example embodiment of the present invention. Tire 1200 is substantially identical to tire 1100, except that tire 1200 includes circumferentially continuous slits 1222 that are slanted radially outward (away from the heel) and circumferentially continuous slits 1226 that are slanted axially outward (towards the heel). Circumferentially continuous slits 1222 are at an acute angle $\theta_9$ (at an angle slanted away from the heel) relative to line A-A drawn along the outside surface of the flange region and circumferentially continuous slits 1226 are at an acute angle $\beta_9$ (at an angle slanted towards the heel) relative to the line B-B drawn along outside surface of the ledge region. In one embodiment, circumferentially continuous slits 1222 and circumferentially continuous slits 1226 are each at an angle that ranges from about 0 degree to about 90 degrees, in another embodiment, from about 10 degrees to about 80 degrees. In another embodiment, circumferentially continuous slits 1222 and circumferentially continuous slits 1226 are at different angles that each range from about 10 degrees to about 80 degrees.

Figure 13:
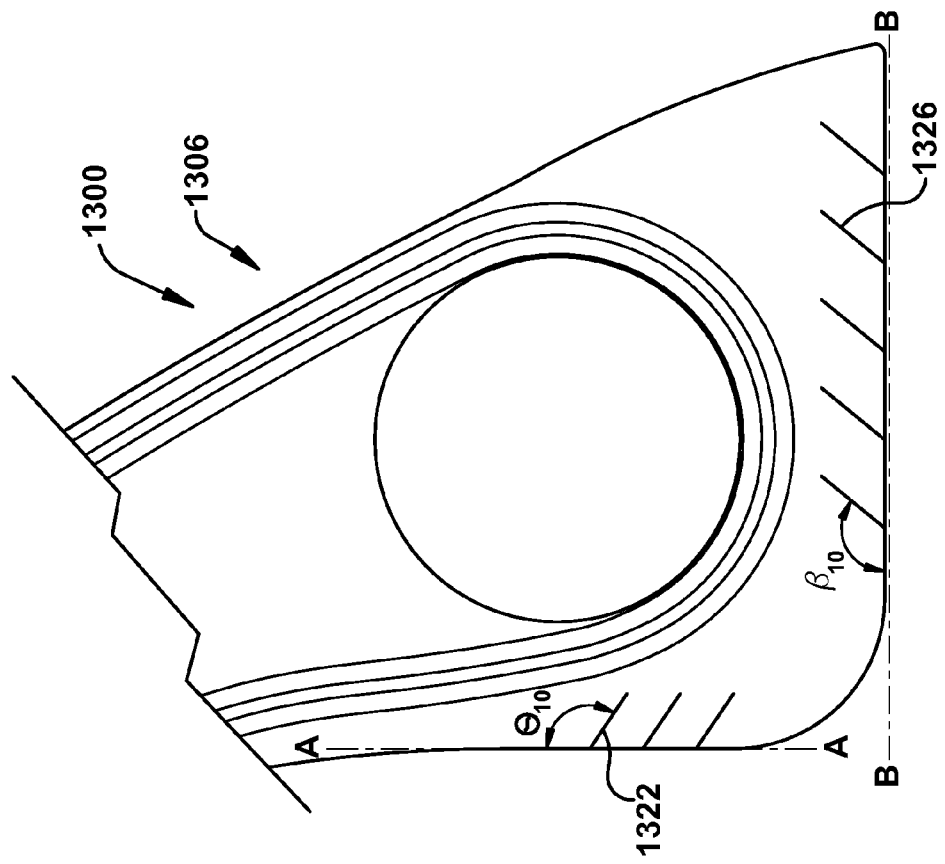
FIG. 13 is a cross-sectional illustration of a bead portion 1306 of a tire 1300, according to an embodiment of the present invention.

FIG. 13 illustrates an alternative embodiment of an enlarged cross-sectional view of a portion of a tire 1300 depicting a bead portion 1306 in greater detail. Tire 1300 is substantially identical to tire 1100, except that tire 1300 includes circumferentially continuous slits 1322 that are slanted radially inward (towards the heel) and circumferentially continuous slits 1326 that are slanted axially inward (away from the heel). Circumferentially continuous slits 1322 are at an obtuse angle $\theta_{10}$ (at an angle slanted towards the heel) relative to line A-A drawn along the outside surface of the flange region and circumferentially continuous slits 1326 are at an obtuse angle $\beta_{10}$ (at an angle slanted towards the toe)

relative to the line B-B drawn along outside surface of the ledge region. In one embodiment, circumferentially continuous slits 1322 and circumferentially continuous slits 1326 are each at an angle that ranges from about 90 degree to about 170 degrees, and in another embodiment, from about 90 degrees to about 170 degrees. In another embodiment, continuous slits 1322 and circumferentially continuous slits 1326 are at different angles that range from about 90 degrees to about 170 degrees.

While embodiments of the invention have been described, it would be understood by those skilled in the art that various changes may be made and equivalence may be substituted for the tire or bead region thereof without departing from the scope of the invention. Therefore, many modifications may be made to adapt the bead region to the teachings of the invention without departing from the essential scope thereof. Therefore, it is intended that the invention not be limited to particular embodiments, but that the invention will include all embodiments falling within the scope of the pending claims.

What is claimed is:

1. A tire having an inner peripheral surface forming a tire cavity, the tire comprising:
    a pair of circumferentially extending bead portions comprising:
        a bead core;
        a ledge region radially inward of the bead core and forming a substantially cylindrical or substantially frustoconical annular surface, the ledge region having at least one circumferentially continuous ledge groove disposed therein, wherein each ledge groove has at least three substantially planar surfaces including a first substantially planar ledge groove surface oriented at an angle between 15 degrees and 60 degrees relative to a line tangent to the annular surface of the ledge region, a second substantially planar ledge groove surface parallel to the first substantially planar ledge groove surface, and a third substantially planar ledge groove surface extending from the first substantially planar ledge groove surface to the second substantially planar ledge groove surface;
        a flange region axially outward of the bead core and forming a substantially planar or substantially frustoconical annular surface, the flange region having at least one circumferentially continuous flange groove disposed therein, wherein each flange groove has at least three substantially planar surfaces including a first substantially planar flange groove surface oriented at an angle between 15 degrees and 60 degrees relative to a line tangent to the annular surface of the flange region, a second substantially planar flange groove surface parallel to the first substantially planar flange groove surface, and a third substantially planar flange groove surface extending from the first substantially planar flange groove surface to the second substantially planar flange groove surface;
        a toe region forming an annular surface that connects the annular surface of the ledge region to the inner peripheral surface of the tire; and
        a heel region having a smooth, continuous annular surface extending from the annular surface of the ledge region to the annular surface of the flange region.

2. The tire of claim 1, wherein the first substantially planar flange groove surface is oriented at an angle that ranges from 45 degrees to 60 degrees relative to the line tangent to the annular surface of the flange region.

3. The tire of claim 1, wherein the first substantially planar ledge groove surface is oriented at an angle that ranges from greater than 45 degrees to 60 degrees relative to the line tangent to the annular surface of the ledge region.

4. The tire of claim 1, wherein the at least one circumferentially continuous flange groove has a width of up to about 4 millimeters.

5. The tire of claim 1, wherein the at least one circumferentially continuous ledge groove has a width of up to about 4 millimeters.

6. The tire of claim 1, wherein the at least one circumferentially continuous flange groove has a depth of at least 0.5 millimeters.

7. The tire of claim 1, wherein the at least one circumferentially continuous ledge groove has a depth of at least 0.5 millimeters.

8. The tire of claim 1, wherein the flange region includes at least two circumferentially continuous flange grooves.

9. The tire of claim 1, wherein the ledge region includes at least two circumferentially continuous ledge grooves.

10. A tire having an inner peripheral surface forming a tire cavity, the tire comprising:
    a circumferential tread;
    at least one circumferential belt;
    at least one carcass ply extending circumferentially about the tire;
    a pair of sidewalls;
    a pair of circumferentially extending bead portions comprising:
        a bead core;
        a ledge region radially inward of the bead core and forming a substantially cylindrical or substantially frustoconical annular surface, the ledge region having at least one circumferentially continuous ledge groove disposed therein, wherein each ledge groove has at least three substantially planar surfaces including a first substantially planar ledge groove surface oriented at an angle between 15 degrees and 60 degrees relative to a line tangent to the annular surface of the ledge region, a second substantially planar ledge groove surface parallel to the first substantially planar ledge groove surface, and a third substantially planar ledge groove surface extending from the first substantially planar ledge groove surface to the second substantially planar ledge groove surface;
        a flange region axially outward of the bead core and forming a substantially planar or substantially frustoconical annular surface, the flange region having at least one circumferentially continuous flange groove disposed therein, wherein each flange groove has at least three substantially planar surfaces including a first substantially planar flange groove surface oriented at an angle between 15 degrees and 60 degrees relative to a line tangent to the annular surface of the flange region, a second substantially planar flange groove surface parallel to the first substantially planar flange groove surface, and a third substantially planar flange groove surface extending from the first substantially planar flange groove surface to the second substantially planar flange groove surface;
        a toe region forming an annular surface that connects the annular surface of the ledge region to the inner peripheral surface of the tire;

a heel region having a smooth, continuous annular surface extending from the annular surface of the ledge region to the annular surface of the flange region; and a bead filler.

11. The tire of claim 10, wherein the first substantially planar flange groove surface is oriented at an angle that ranges from 45 degrees to 60 degrees relative to the line tangent to the annular surface of the flange region.

12. The tire of claim 11, wherein the first substantially planar ledge groove surface is oriented at an angle that ranges from 45 degrees to 60 degrees relative to the line tangent to the annular surface of the ledge region.

13. The tire of claim 10, wherein the at least one circumferentially continuous flange groove has a width of up to about 4 millimeters and the at least one circumferentially continuous ledge groove has a width of up to about 4 millimeters.

14. The tire of claim 10, wherein the at least one circumferentially continuous flange groove and the at least one circumferentially continuous ledge groove each have a depth of at least 0.5 millimeters.

15. The tire of claim 10, wherein the at least one circumferentially continuous flange groove has a depth of up to 5 millimeters and the at least one circumferentially continuous ledge groove has a depth of up to 5 millimeters.

16. The tire of claim 10, wherein the flange region includes at least three circumferentially continuous flange grooves that are equally spaced from each other.

17. The tire of claim 10, wherein the ledge region includes at least three circumferentially continuous ledge grooves that are equally spaced from each other.

* * * * *